United States Patent
Wang et al.

(10) Patent No.: US 8,384,533 B2
(45) Date of Patent: Feb. 26, 2013

(54) HOSTLESS AUTOMOBILE REVERSE RADAR WARNING SYSTEM

(75) Inventors: Meng Chien Wang, Kaohsiung Hsien (TW); Sen Wei, Kaohsiung Hsien (TW); Shih-Feng Chiang, Kaohsiung Hsien (TW)

(73) Assignee: Whetron Electronics Co., Ltd., Kaohsiung Hsien (TW)

( * ) Notice: Subject to any disclaimer, the term of this patent is extended or adjusted under 35 U.S.C. 154(b) by 424 days.

(21) Appl. No.: 12/763,918

(22) Filed: Apr. 20, 2010

(65) Prior Publication Data

US 2011/0254674 A1    Oct. 20, 2011

(51) Int. Cl.
*G08B 21/00* (2006.01)
(52) U.S. Cl. ........ 340/435; 340/436; 340/438; 340/903; 367/99; 367/909; 180/167
(58) Field of Classification Search .................. 340/435, 340/436, 438, 903; 367/99, 909; 180/167
See application file for complete search history.

(56) References Cited

U.S. PATENT DOCUMENTS

| | | | | |
|---|---|---|---|---|
| 5,754,123 A | * | 5/1998 | Nashif et al. | 340/903 |
| 6,072,391 A | * | 6/2000 | Suzuki et al. | 340/468 |
| 8,106,755 B1 | * | 1/2012 | Knox | 340/439 |
| 2002/0180597 A1 | * | 12/2002 | Flick | 340/436 |
| 2005/0159892 A1 | * | 7/2005 | Chung | 701/301 |
| 2006/0220826 A1 | * | 10/2006 | Rast | 340/479 |
| 2007/0164852 A1 | * | 7/2007 | Litkouhi | 340/435 |
| 2008/0024283 A1 | * | 1/2008 | Kim | 340/431 |

* cited by examiner

*Primary Examiner* — Jennifer Mehmood
*Assistant Examiner* — Mark Rushing
(74) *Attorney, Agent, or Firm* — Chun-Ming Shih

(57) ABSTRACT

A hostless automobile reverse radar warning system installed to an automobile includes a reverse signal light power module for supplying an electric power required by the system, a plurality of distance sensing modules installed to an external periphery of the automobile for performing a distance detection to detect external environment conditions of the automobile, producing a distance detection result, and generating a warning signal based on the distance detection result, and a warning module for receiving the warning signal and producing a sound to alert a driver based on the warning signal.

4 Claims, 2 Drawing Sheets

HOSTLESS AUTOMOBILE REVERSE RADAR WARNING SYSTEM

BACKGROUND OF THE INVENTION

1. Field of the Invention

The present invention relates to a hostless automobile reverse radar warning system, and more particularly to a radar system that performs a distance detection to detect external environment conditions by a plurality of distance sensing modules directly and generate a warning signal, and then produces a sound by a warning module to alert a driver based on the warning signal.

2. Description of Related Art

In general, a conventional automobile reverse radar systems usually includes a control host with a plurality of distance sensors connected in parallel with each other and installed at both front and rear bumpers of an automobile through a plurality of connectors and wire harnesses, and the control host is provided for receiving a sensing signal transmitted from the distance sensors, and converting the received sensing signal into a warning signal, such that a warning unit can produce a sound to remind a driver based on the warning signal.

However, if the distance sensors are connected in parallel with the control host by the wire harnesses, the wiring path in the automobile will become relatively complicated, so that more wire harnesses will be used, a higher manufacturing cost of the automobile will be incurred, and a longer manufacturing time will be required for the installation, and thus the overall manufacturing procedure of the automobile cannot be simplified. Obviously, the subjects of decreasing the number of required wire harnesses and connectors, lowering the manufacturing cost as well as reducing the installation time of the automobile demand immediate attentions and feasible solutions.

SUMMARY OF THE INVENTION

Therefore, it is a primary objective of the present invention to provide a hostless automobile reverse radar warning system comprising a reverse signal light power module for supplying an electric power required by the system, a plurality of distance sensing modules for producing a distance detection result after a distance detection is performed to detect external environment conditions of an automobile and generating a warning signal based on the distance detection result, and a warning module for producing a sound to alert a driver based on the warning signal, so as to achieve the effects of reducing the quantity of required wire harnesses and lowering the manufacturing cost.

To achieve the foregoing objective, the present invention provides a reverse signal light power module for supplying an electric power required by the system, a plurality of distance sensing modules installed around the external periphery of the automobile by a parallel connection of circuits for receiving the electric power, performing a distance detection to detect external environment conditions of the automobile and produce a distance detection result, and generating a warning signal based on the distance detection result, and a warning module for receiving the warning signal and producing a sound to alert a driver based on the warning signal.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
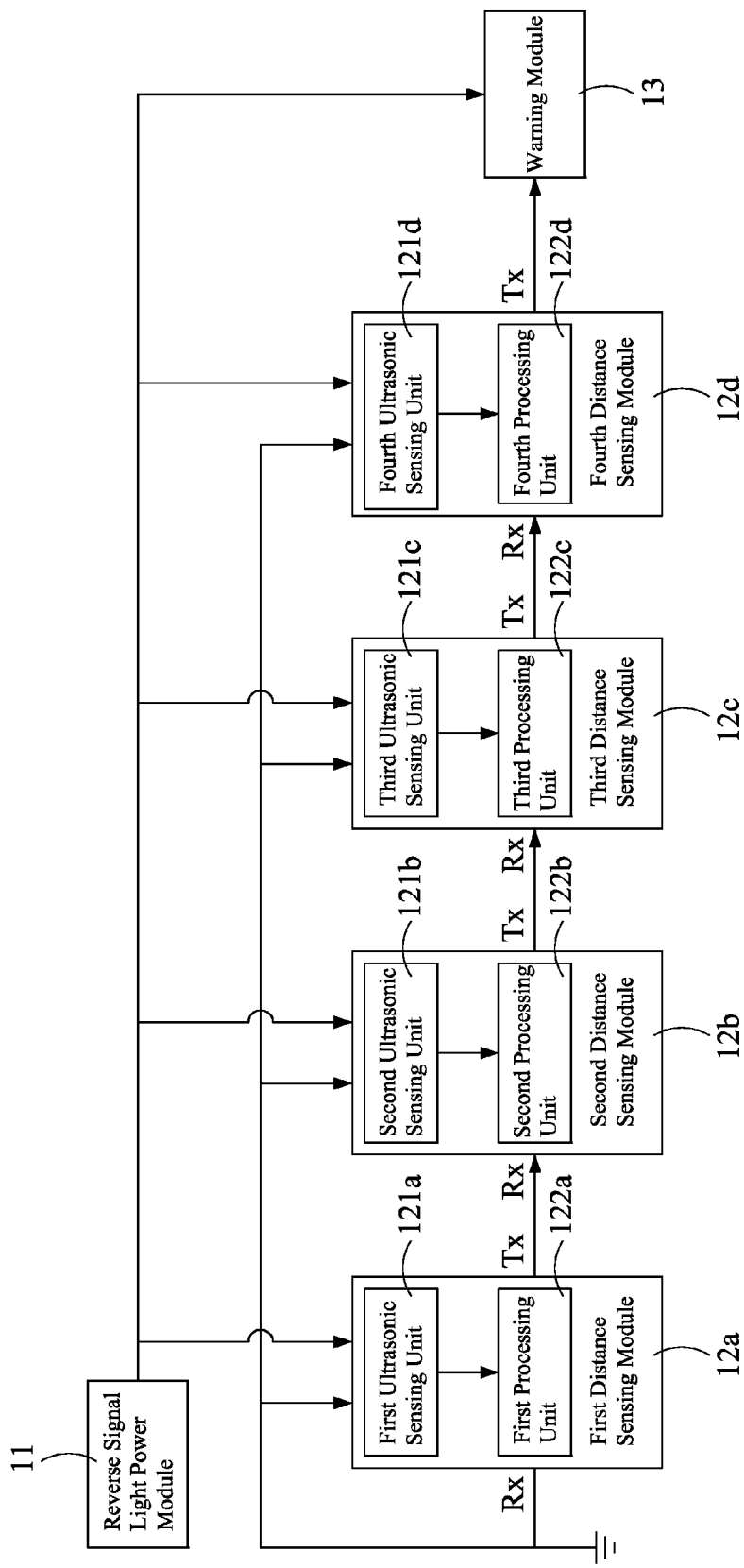
FIG. 1 is a schematic block diagram of a preferred embodiment of the present invention.
Figure 2:
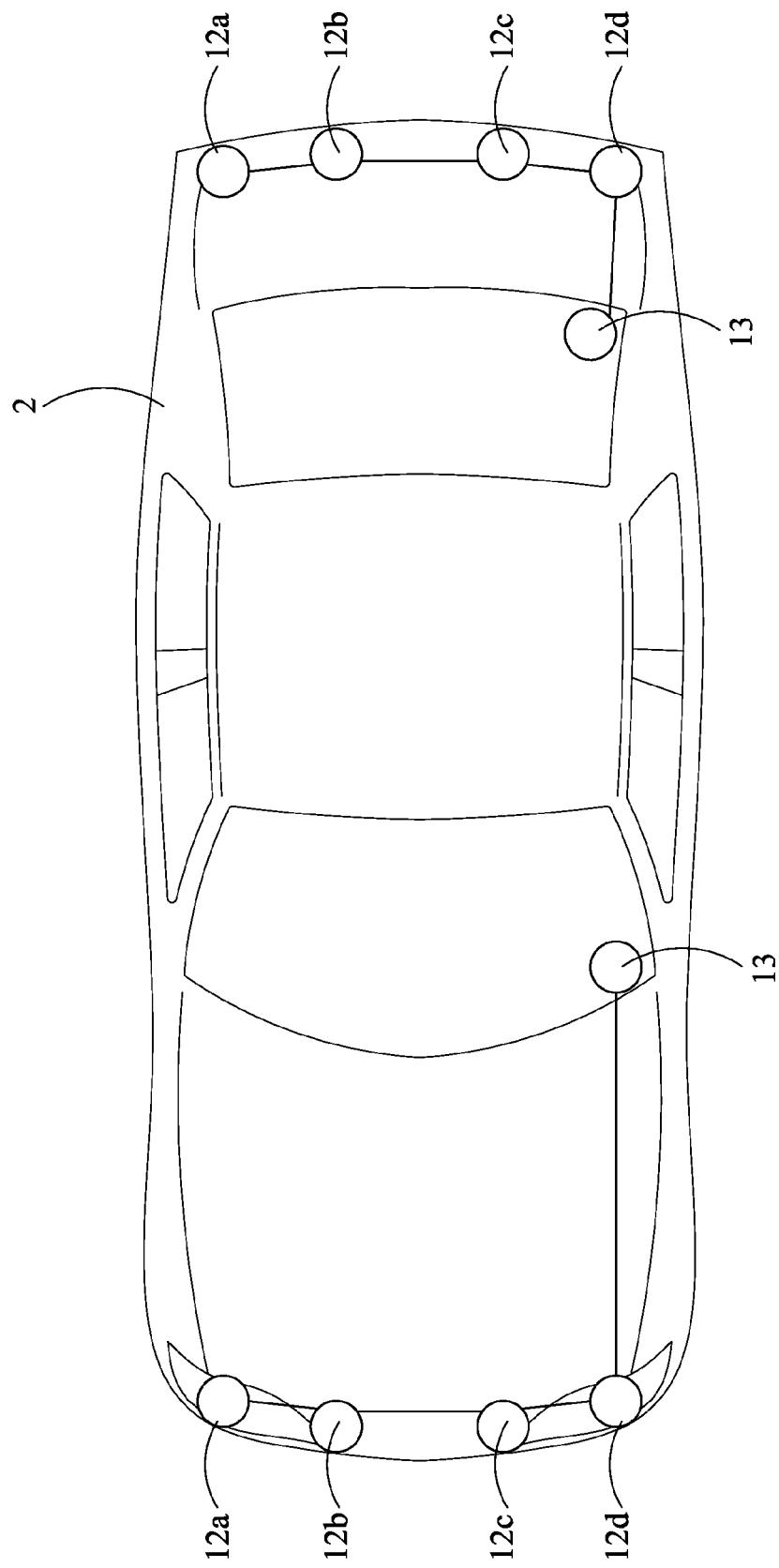
FIG. 2 is a schematic view of an automobile reverse radar warning system installed to a motor vehicle in accordance with a preferred embodiment of the present invention.

In FIGS. 1 and 2, a hostless automobile reverse radar warning system installed to an automobile 2 comprises a reverse signal light power module 11, a plurality of distance sensing modules 12a, 12b, 12c, 12d (such as a first distance sensing module 21a, a second distance sensing module 21b, a third distance sensing module 21c, and a fourth distance sensing module 21d) and a warning module 13.

The reverse signal light power module 11 supplies an electric power required by the system.

The distance sensing modules 12a, 12b, 12c, 12d installed at the external periphery of automobile 2 are electrically connected in parallel with each other and provided for receiving the electric power, performing a distance detection to detect external environment conditions of the automobile 2, and generating a warning signal based on the distance detection.

The warning module 13 receives the warning signal, and produces a sound to alert a driver based on the warning signal.

In this embodiment, the distance sensing modules 12a, 12b, 12c, 12d are equidistantly installed at the external periphery of the automobile 2, and each distance sensing module 12a, 12b, 12c, 12d comprises an ultrasonic sensing unit 121a, 121b, 121c, 121d (such as a first ultrasonic sensing unit 121a, a second ultrasonic sensing unit 121b, a third ultrasonic sensing unit 121c, and a fourth ultrasonic sensing unit 121d) and a processing unit 122a, 122b, 122c, 122d (such as a first processing unit 122a, a second processing unit 122b, a third processing unit 122c, and a fourth processing unit 122d) wherein the ultrasonic sensing units 121a, 121b, 121c, 121d are provided for performing the distance detection to detect the external environment conditions of the automobile 2 to produce the distance detection result and transmit the distance detection result to the processing units 122a, 122b, 122c, 122d for processing, and the processing units 122a, 122b, 122c, 122d will generate the warning signal based on the distance detection result and output the warning signal.

If a driver wants to park the automobile 2 into a parking space, the driver may shift the transmission into a reverse gear (R) and start the hostless automobile reverse radar warning system installed at the back of the automobile 2, and the distance sensing modules 12a, 12b, 12c, 12d will receive electric power from the reverse signal light power module 11 at the same time, and the distance sensing modules 12a, 12b, 12c, 12d are connected in parallel to each other. If the voltage value at a communication port measured by one of the distance sensing modules 12a, 12b, 12c, 12d is equal to 0V, the distance sensor 12a having a measured voltage value equal to 0V at the communication port is defined as the first distance sensor 12a, and the first distance sensing module 12a will produce a first ultrasonic wave from a first ultrasonic sensing unit 121a and start detecting an obstacle near the external periphery of the automobile 2 and a first processing unit 122a installed in the first distance sensor 12a will produce first distance information based on the detected distance information, and a communication transmitter port (Tx) of the first distance sensing module 12a will transmit the first distance information to a receiver port (Rx) of the second distance sensing module 12b.

After the second distance sensing module 12b receives the first distance information, a second ultrasonic sensing unit 121b installed in the second distance sensing module 12b will produce a second ultrasonic wave to detect an obstacle outside the automobile 2 and a second processing unit 122b will process the detected distance information of the obstacle to produce second distance information, and will transmit the second distance information together with the first distance information from the communication transmitter port (Tx) of the second distance sensing module 12b to a receiver port (Rx) of the third distance sensing module 12c.

After the third distance sensing module 12c receives the first distance information and the second distance information, a third ultrasonic sensing unit 121c installed in the third distance sensing module 12c will produce a third ultrasonic wave to detect an obstacle outside the automobile 2, and a third processing unit 122c will process the detected distance information of the obstacle to produce third distance information, and transmit the third distance information together with the first distance information and the second distance information from the communication transmitter port (Tx) of the third distance sensing module 12c to a receiver port (Rx) of the fourth distance sensing module 12d.

After the fourth distance sensing module 12d receives the first distance information, the second distance information and the third distance information, a fourth ultrasonic sensing unit 121d installed in the fourth distance sensing module 12d will produce a fourth ultrasonic wave to detect an obstacle outside the automobile 2, and a fourth processing unit 122d will process the detected distance information of the obstacle to produce fourth distance information, and the first distance information, the second distance information, the third distance information the fourth distance information will be integrated to generate a warning signal, and the warning signal will be transmitted from the communication transmitter port (Tx) of the fourth distance sensing module 12d to the warning module 13.

The warning module 13 is a buzzer that produces a sound varied with an approaching distance of the obstacle and based on the received warning signal to remind a driver of the automobile 2 about the situation of approaching the obstacle, so that the driver can make a decision to stop reversing the automobile 2 after hearing a series of sounds.

If the driver wants to park the automobile, the driver may shift the transmission into a drive gear (D) to turn on the hostless automobile reverse radar warning system installed at a front end of the automobile 2, and the overall operation of the hostless automobile reverse radar warning system is the same as the operation described above, and thus such operation will not be described here again.

In summation of the description above, the distance sensing modules 12a, 12b, 12c, 12d of the hostless automobile reverse radar warning system of the present invention are electrically connected in parallel with each other, such that the distance detection for detecting external environment conditions at the external periphery of the automobile 2 can be performed, and the invention can simplify the wiring path inside the automobile 2 for installing the system, and achieve the effect of reducing the quantity of required wire harnesses.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A hostless automobile reverse radar warning system, installed to an automobile, and comprising:
    a reverse signal light power module, for supplying an electric power required by the system;
    a plurality of distance sensing modules, installed to an external periphery of the automobile by a parallel connection of circuits, for receiving the electric power, performing a distance detection to detect external environment conditions of the automobile and produce a distance detection result, wherein each of the distance sensing modules outputs the distance detection result produced thereby to the distance sensing module subsequent thereto to activate distance detection by the subsequent sensing module until a last one of the distance sensing modules produces the distance detection result thereof, and generating a warning signal based on the distance detection results integrated from all the distance sensing modules; and
    a warning module, for receiving the warning signal, and producing a sound to alert a driver based on the warning signal.

2. The hostless automobile reverse radar warning system of claim 1, wherein each distance sensing module comprises an ultrasonic unit and a processing unit, and the ultrasonic unit is provided for performing the distance detection to detect the external environment conditions of the automobile, produce the distance detection result, and transmit the distance detection result to the processing unit for processing, so as to generate the warning signal and output the warning signal.

3. The hostless automobile reverse radar warning system of claim 1, wherein the distance sensing modules are installed equidistantly along the external periphery of the automobile.

4. The hostless automobile reverse radar warning system of claim 1, wherein the warning module is a buzzer.

* * * * *